No. 698,356. Patented Apr. 22, 1902.
E. V. BEALS.
INDICATOR.
(Application filed Apr. 18, 1901.)
(No Model.)
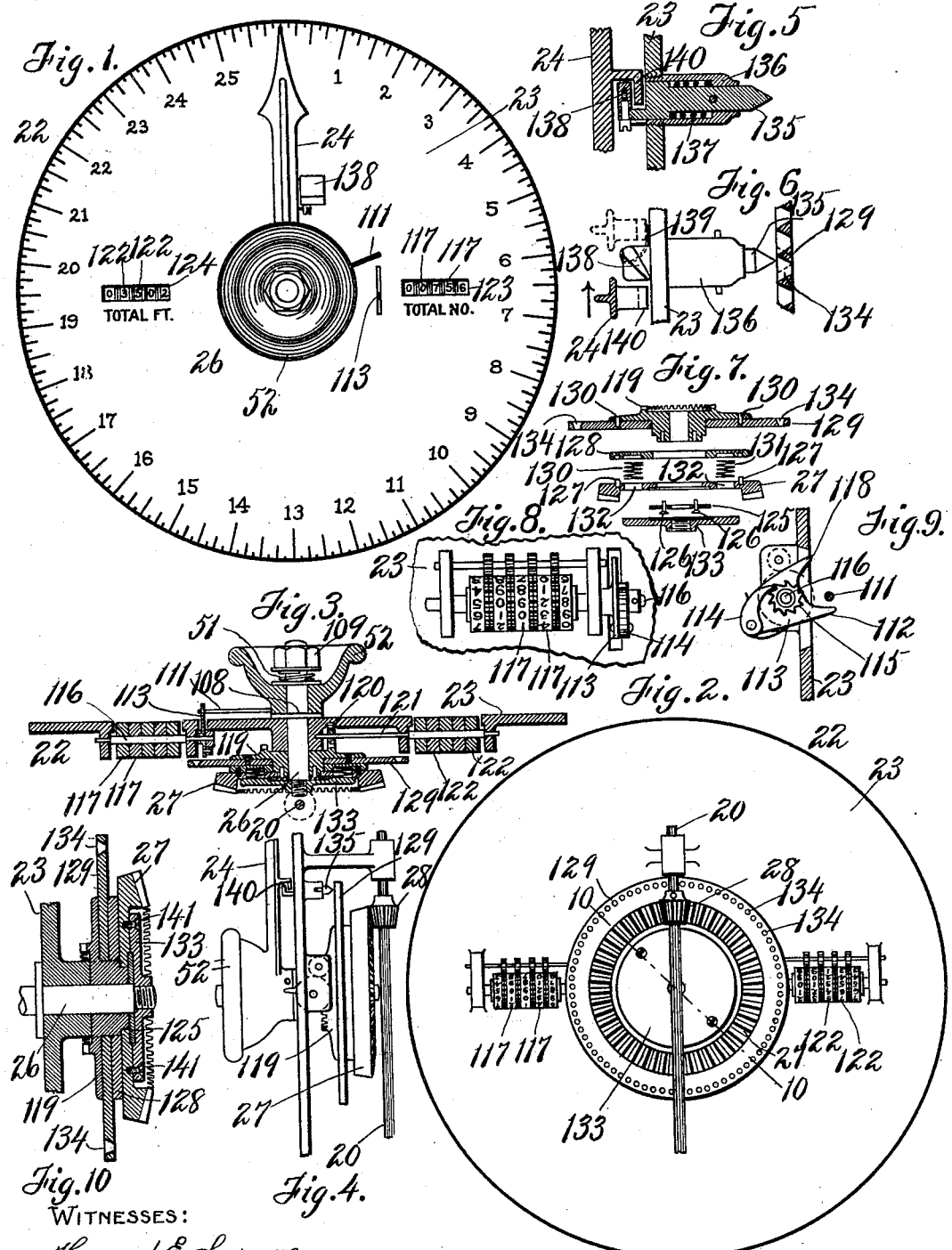
WITNESSES:
Howard E. Savage
C. C. Stecker
INVENTOR:
E. V. Beals
BY Wright Brown & Quinby
attys.

UNITED STATES PATENT OFFICE.

ERL V. BEALS, OF BOSTON, MASSACHUSETTS.

INDICATOR.

SPECIFICATION forming part of Letters Patent No. 698,356, dated April 22, 1902.

Application filed April 18, 1901. Serial No. 56,388. (No model.)

*To all whom it may concern:*

Be it known that I, ERL V. BEALS, of Boston, in the county of Suffolk and State of Massachusetts, have invented certain new and useful Improvements in Indicating Devices, of which the following is a specification.

This invention relates generally to indicating devices, and it relates more particularly to indicating devices adapted for employment on leather-measuring and other machines to indicate the area or other statistics of each individual piece which is subjected to the action of the machine and the sum-total of the individual readings.

The invention consists in certain novel features of construction and arrangement, which I shall now proceed to describe and claim.

Of the accompanying drawings, forming a part of this specification, Figure 1 represents a front elevation of an indicator constructed in accordance with my invention. Fig. 2 represents a rear elevation thereof. Fig. 3 represents a horizontal axial section. Fig. 4 represents a side elevation, partly broken away. Fig. 5 represents a detail section of the correcting device. Fig. 6 represents a horizontal section and plan thereof. Fig. 7 represents a view of parts shown in Fig. 3 in dissembled condition. Fig. 8 represents a rear elevation of the total-indicator. Fig. 9 represents a section showing the said indicator in side elevation. Fig. 10 represents a section on the line 10 10 of Fig. 2.

The same reference characters indicate the same parts in all of the figures.

In the drawings, 22 represents the indicator generally.

20 represents a shaft adapted to form a part of or to be applied to a leather-measuring or other measuring machine, which is rotated intermittently in different degrees according to the measurements of the pieces which are successively subjected to the action of the machine, the rotation being always in one direction. On said shaft 20 is a bevel-pinion 28, meshing with a bevel-gear 27, which rotates a pointer-shaft 26, carrying a pointer 24. This pointer sweeps over a dial 23, having an index graduated in suitable units, as square feet, and is adapted to be returned to zero position after each reading, said pointer 24 having for this purpose a finger-knob 52 on its hub and a frictional connection with the shaft 20, comprising a shoulder 108 on the shaft, against which the hub of the pointer is seated, an adjustable nut 109 on the shaft outside of the pointer-hub, and a spring 51 interposed between the said nut and the pointer-hub. The pointer-hub is provided with an arm 111, adapted on each outward movement of the pointer to engage the lower toe 112 of an oscillating pawl-carrier 113, having a pawl 114, which engages a ratchet 115 on the shaft 116 of a counter. Said counter, as shown, comprises a series of wheels 117 117 and suitable connections whereby each succeeding wheel makes one revolution for ten of the preceding wheel, whereby the total number of strokes of the pointer 24, and hence the total number of articles measured, are registered. After the reading of the pointer has been observed and tallied by the attendant by marking said reading on the article measured or otherwise the pointer is returned to zero position, and in this return the arm 111 strikes against the upper toe 118 of the pawl-carrier 113 and moves said pawl-carrier back to its initial position, allowing the pawl 114 to make a new tooth on the ratchet 115.

119 is a crown-gear mounted to rotate with the shaft or arbor 26 and engaging a pinion 120 on the shaft 121 of a total-indicator. Said indicator comprises wheels 122 122, connected in a manner similar to the wheels 117 117, so as to add up the total of the successive readings of the pointer 24. The readings of the counter-wheels 117 117 and the total-indicator wheels 122 122 are observed through slots 123 124 in the dial 23. A screw-plate 125, connected by screws 126 126 to the crown-gear member 119, lies between the gear 27 and an end plate 133, secured to the rear end of arbor 26. Plate 133 is attached to gear 27 by screws 141 141. Gear 27 is connected by dowels 127 127 to a friction-plate 128, which bears against a correcting-wheel 129, the latter being in turn connected by dowels 130 130 to the crown-gear member 119. The gear 27 and friction-plate 128 therefore rotate together, and the correcting-wheel 129 and crown-gear 119 rotate together. Friction-plate 128 is pressed outwardly against the correcting-wheel 129 by springs 131 131, passing through holes 132 132 in the web of the gear 27 and bearing against the end plate 133. By this arrangement the axial pressure of the springs 131, transmitted through the friction-plate 128 and correcting-wheel 129 to the crown-gear 119, is brought back through the retaining screw-plate 125 to the outer face of gear 27, and is hence entirely borne by the end plate 133. The arbor 26 is therefore relieved of all axial pressure and tendency to bind in its bearing. The correcting-wheel 129 is provided with a series of conical holes 134 134, placed close together around its periphery. 135 is a dog mounted to slide in a fixed socket 136 on the dial 23 and having a conical rear end adapted to enter any of the holes 134, said dog being normally pressed by a spring 137 forwardly away from contact with the correcting-plate 129. On its forward end the dog 135 is provided with a pivoted cam member 138, normally pressed by a leaf-spring 139 into a position inclined to the face of the dial 23. On the back side of the pointer 24 is a projection 140, adapted on the outward movement of said pointer to pass under the cam member 138 between it and the dial 23 and lift its free end away from said dial and on the return movement of said pointer adapted to ride over the inclined outer face of the cam member and press said cam member into a position substantially parallel to the dial 23, thereby forcing the dog 135 rearwardly into engagement with the correcting-wheel 129.

Supposing the numbers "1," "2," "3," "4," &c., represented on the face of the dial 23 in Fig. 1, to represent square feet, it will be noted that the intermediate portions represent eighths, quarters, and halves of square feet. The holes 134 in the correcting-wheel 129 are arranged at distances apart corresponding to the quarter-divisions of the dial. Supposing that on the outward movement of the pointer 24 it were to indicate a reading of ten and slightly more than a quarter, the correcting-wheel 129 would then stop with one of its holes 134 in a position slightly out of register with the conical end of the dog 135. On the return of the pointer to zero the dog 135 in its rearward movement will exert a cam action against the sides of the hole 134 and bring it into full register with the dog, thus moving the wheel 129 and the total-index backward to indicate the nearest quarter without disturbing the rotary position of the arbor 26. If the pointer instead of stopping at a full ten and a quarter had stopped at a scant ten and a half, the opposite side of the hole 134 in Fig. 6 would have been nearest to the point of dog 135, and the correcting-plate 129, carrying with it the total-index shaft, would have moved forward to indicate an exact ten and one-half. The total-index will therefore always record the one-quarter division nearest which the pointer stops. Since it is the custom in measuring skins and other articles to read the units-index to the nearest quarter or other division instead of reading its exact position, the total-index if it merely summed up the total of the movements of the shaft 20 would not correspond to the sum of the readings tallied by the attendant from observing the units-index. With my invention this reading will tally.

In practice the point of the dog 135 and the edges between the holes 134 are made so sharp that the dog will not lodge and stay between two holes even though the pointer 24 stops exactly between two quarter divisions of the scale. This reading seldom occurs, but if it should the operator may observe upon resetting the pointer 24 whether the total-index moves ahead or back and tally his reading accordingly. It will be seen that the correcting device is operative throughout the cycle of the total-indicator.

The correcting device obviously might be arranged to be operated otherwise than by the return of a movable indicator member, such as the pointer 24. For instance, it might be operated manually.

In the drawings the total-indicator and the counter are represented conventionally. Their specific construction forms no part of my invention and is not represented in detail, since such devices are already well known.

I claim—

1. An indicator, correcting means having a predetermined influence in opposite directions to correct said indicator to its fractional divisions, said means being operative throughout the cycle of the indicator, a unidirection indicator-propelling shaft, and a slip connection between said indicator and shaft.

2. A primary indicator, a secondary indicator actuated proportionately thereto, provisions for resetting the primary indicator independently of the secondary indicator, and means actuated by the resetting of the primary indicator and having a predetermined influence in opposite directions to correct said secondary indicator to its fractional divisions.

3. A primary indicator having a series of indicating divisions on or between which it indicates, a secondary indicator actuated proportionately to said primary indicator, provisions for resetting the primary indicator independently of the secondary indicator, and means actuated by the resetting of the primary indicator for correcting the secondary indicator to the nearest of said divisions indicated by the primary indicator.

4. An indicator, and a correcting device therefor comprising a rotary member connected to the indicator and a stationary member, one of which is a wheel having a series of cam divisions and the other a coacting cam-dog adapted to register the cam divisions with itself, and provisions for bringing said members into and out of coacting relation.

5. A device for indicating the measurements of a series of articles comprising a shaft whose rotary movements are to be measured, a total-indicator provided with a movable indicating member having a slip connection with said shaft, a primary indicator for individual indications provided with a movable indicating member having a slip connection with said shaft whereby it may be returned after an indication, and a correcting device for the total-indicator comprising a rotary member connected to the movable total-indicator member, and a stationary member, one of which is a wheel having a series of cam divisions and the other a coacting cam-dog adapted to register the cam divisions with itself, and provisions for bringing said members of the correcting device into coacting relation by the return of said movable primary-indicator member.

6. In an indicating device, a unidirection shaft, an indicating member adapted to measure the rotation of said shaft and having a slip connection therewith permitting it to be reset with respect thereto, and a counter operated by said indicating member and adapted to count the strokes thereof.

In testimony whereof I have affixed my signature in presence of two witnesses.

ERL V. BEALS.

Witnesses:
R. M. PIERSON,
C. C. STECHER.